United States Patent [19]
Darboux et al.

[11] Patent Number: 6,104,777
[45] Date of Patent: Aug. 15, 2000

[54] PROCESS FOR THE CORRECTION OF SCATTERING IN DIGITAL X-RAY IMAGES

[75] Inventors: Michel Darboux, Grenoble; Jean-Marc Dinten, Lyons, both of France

[73] Assignee: Commissariat a l'Energie Atomique, Paris, France

[21] Appl. No.: 09/171,322

[22] PCT Filed: Feb. 13, 1998

[86] PCT No.: PCT/FR98/00278

§ 371 Date: Oct. 15, 1998

§ 102(e) Date: Oct. 15, 1998

[87] PCT Pub. No.: WO98/36380

PCT Pub. Date: Aug. 20, 1998

[30] Foreign Application Priority Data

Feb. 17, 1997 [FR] France .................................. 97 01810

[51] Int. Cl.⁷ .................................................. G01N 23/04
[52] U.S. Cl. .................. 378/62; 378/87; 378/98
[58] Field of Search ................... 378/62, 86, 87, 378/89, 98

[56] References Cited

U.S. PATENT DOCUMENTS

| 5,440,647 | 8/1995 | Floyd, Jr. et al. ..................... 382/132 |
| 5,862,199 | 1/1999 | MacKenzie .............................. 378/89 |

FOREIGN PATENT DOCUMENTS 0 358 268 A1  3/1990  European Pat. Off. .

OTHER PUBLICATIONS

1991 IEEE Nuclear Science Symposium & Medical Imaging Conference, vol. 3, Nov. 2–9, 1991, Santa Fe, NM USA, "Solid Geometry Based Modelling of Non–Uniform Attenuation and Compton Scattering in Objects for Spect Imaging Systems" Wang, H. et al.

Medical Physics, vol. 22, No. 10, Oct. 1, 1995 "A Transmission–Map–Based Scatter Connection Technique for Spect in Inhomogeneous Media" Welch, A. et al.

IEEE Nuclear Science Symposium, vol. 2, Nov. 2–9, 1996 "A New Method for Modelling the Spatially–Variant, Object–Dependent Scatter Response Function in Spect" Frey .E.C. et al.

*Primary Examiner*—David V. Bruce
*Attorney, Agent, or Firm*—Eugene Lieberstein; Michael N. Meller

[57] ABSTRACT

The present invention relates to a process for correcting scatter energy in which:

using an X-ray and a first three-dimensional model of the object, a second model of the object is generated adapted to its geometry;

the source energy spectrum is made discrete and an average density value is allocated to each zone of this object;

primary energy is mapped;

along the source-point tracklength of the primary energy map, a new average density value is determined for each of the zones and for each source-point tracklength of the detector;

a coherent distribution coefficient and an incoherent distribution coefficient are obtained per energy, per tracklength and per zone;

scatter energy is mapped;

primary energy is mapped and an image of the object is obtained.

11 Claims, 4 Drawing Sheets

COMPRESSION HEIGHT

DETECTOR

ABSORPTION COEFFICIENT, $1\mu$ (CM-1)

ENERGY (KeV)

SCATTER COEFFICIENT $\mu$(CM-1)

ENERGY (KeV)

PROCESS FOR THE CORRECTION OF SCATTERING IN DIGITAL X-RAY IMAGES

TECHNICAL FIELD

The present invention relates to a process for correcting scatter energy in digital X-ray images.

STATE OF THE PRIOR ART

The different known processes of the prior art for the correction of scatter energy are;
processes using convolution methods;
processes using deconvolution methods;
processes of analytical type with equation of scatter radiation and object approximation with an average equivalent plane.

Convolution Methods

The first scatter correction methods using image processing are convolution methods. They are based on the following empirical model $$I_s = w.(I_p - f_s) \quad (I)$$

where:
$I_s$ is the scatter image
$I_p$ is the direct transmission image which is approximated using the observed transmission image;
w is a weighting factor;
$f_s$ is the convolution kernel.

This model is not derived from physical considerations, but only from the finding that scatter appears as a "blurring" phenomenon in the image. This model was postulated by Shaw et al in 1982 with a fixed kernel and a constant weighting factor w, for the entirety of the scatter image. This model was used and improved over the following years:

Naimuddin et al in 1987 suggested, for improved scatter estimation, a variable factor w in relation to the thickness of the object, based on the remark that a "thicker" object produces more scatter (see document reference [1] at the end of this disclosure).

Kruger et al in 1984 proposed a convolution kernel $f_s$ that was variable per region, in an attempt to give consideration to the non-homogeneity of objects (often made up of several different materials). With this variability it is possible, for example in chest radiography, to have a kernel $f_{s1}$ corresponding to the highly scattering central zone (spine, heart . . . ) and a kernel $f_{s2}$ for the less scattering lung areas (see document reference [2]).

Highnam and Brady in 1994, in the area of mammography, suggested a scatter correction method based on this same empirical principle of convolution of observed transmission, but using convolution kernels whose size was dependent upon the thickness of compression at the time of acquisition.

These kernels are estimated by calibration on phantoms of variable thickness. The protocol for mammography imaging allows easy access to this parameter, since the breast is compressed between two parallel plates (see document referenced [3]).

Deconvolution Methods

The second family of scatter correction methods by image processing relates to the so-called "deconvolution" methods, the empirical model being the same as that used in the previous methods. But in this case, primary transmission is not approximated with observed transmission but the following equation is used:

$$I_{obs} = I_p + I_s$$

with:

$$I_s = w.(I_p f_s)$$

Determination of $I_p$, and consequently determination of $I_s$, requires an inversion of the equation, that is to say deconvolution. This is generally made using a Fourier transform.

In 1988 Floyd et al used this approach for chest radiography, using a convolution kernel of $\exp(-b|r|)$ type. The choice of a and b is made by calibration on a chest phantom (see document referenced [4]).

In 1986 and 1988 Bonne and Seibert also used this approach (see document referenced [5]) but with a convolution kernel of Gaussian distribution type with the form:

$$\frac{\rho}{r}\exp\left(-0.5\left(\frac{r}{\sigma}\right)^2\right) \quad (3)$$

$\rho$ being the scattered photon fraction, r being the radial distance in polar co-ordinates of predetermined origin, and $\sigma$ being the extent of Gaussian distribution.

The two parameters $\rho$ and $\sigma$ are also obtained by phantom calibration.

The Analytical Method

This method differs largely from the preceding methods. It is the result of equating the physical phenomenon which is the cause of the creation of scatter. By construction this method gives consideration to the different materials in the imaged object, these materials having an effect on the generation and attenuation of scattered photons.

The main obstacle with this type of approach results from lack of knowledge of the three-dimensional structure of the object; all that is available is the image of observed transmission which only represents a projection of this structure.

In 1988 Boone and Seibert suggested an approach of analytical type which equated the first Compton scattering, restricted to homogeneous objects of constant thickness. In this particular case, the scatter phenomenon may be modelled by convolution of primary transmission with a kernel derived from analytical calculations ( see document reference [8]).

In 1992, C. Burq suggested an approach of this type in which she equated the first Compton scattering using the physical laws governing the scatter phenomenon (see document referenced [6]). To solve the problem of the unknown three-dimensional structure of the object, C. Burq suggested an approximation which consists of replacing the object by an equivalent plane in which the matter is concentrated, this approximation only being valid in cases when the detection screen is sufficiently distant from the object. There are numerous applications in which this hypothesis cannot be verified, for example in mammography, the detection screen being less than one centimeter from the lower surface of the breast.

The equating of the first Rayleigh (coherent) and Compton (incoherent) scattering was made by physicians who, knowing the objects being studied, were able to list for each material the coefficient values of attenuation, coherent and incoherent scattering. For men of the art in digital radiography, it is not simple to use this type of equation since it uses an object which, in this area, is unknown.

The object of the invention is a process in which the object does not need to be brought into an equivalent average plane in order to obtain a good estimate of scatter, in all cases including when the screen is close to the object, which is nearly always the case in medical radiography.

DESCRIPTION OF THE DISCLOSURE

The invention relates to a process for scatter energy correction in digital X-ray images obtained on a detector by means of a source emitting a spectrum of ionizing energies which pass through an object, characterized in that it comprises the following stages:

1/ using an X-ray and first three-dimensional model of the object, a second model of the object is generated adapted to its geometry;

2/ the energy spectrum of the source is made discrete and to each zone of this object an average density value is allocated and, for each of the energies of the discrete spectrum three mass coefficients are allocated for absorption, coherent and incoherent scattering, and by multiplying density with the mass coefficients, the absorption, coherent scatter and incoherent scatter coefficients are determined for each zone and for each energy;

3) primary transmission energy is mapped;

4) along the source-point tracklength of the primary energy map a new average density value is determined for each of the zones and for each source-point tracklength of the detector;

5) for each energy the mass coefficient is multiplied by the density for each source-point tracklength of the detector and for each zone, and a coherent and an incoherent scatter coefficient are obtained per energy, per tracklength and per zone;

6) scatter energy is mapped;

7) primary energy is mapped by subtracting the scatter energy map from the observed transmission energy map, and an image of the object is obtained.

Advantageously, after stage 7), a return is made to stage 3) the transmission energy calculated at stage 7) becoming the primary transmission energy estimated at stage 3) so that successive iterative calculations are carried out to improve the final result.

Advantageously, in stage six, the following equation is used which expresses scatter energy at a point M of the detector and for a given energy:

$$\int\int_{Q \in D_M}\int \mu d(Q, E) \frac{d\sigma}{d\Omega}(\overrightarrow{u(Q)}\overrightarrow{QM}, E) \frac{\cos^3(\theta)}{(QP)^2} \exp(-(av+ap)) dQ$$

in which:

$D_M$ is the part of the object seen from point M;

$\mu d(Q,E)$ is the probability of generating a scattered photon at point Q;

$\overrightarrow{u(Q)}\overrightarrow{QM}, E$ is the angle between scatter direction (QM) and incident direction u(Q) of the X rays arriving at Q;

θ is the angle between the orthogonal on the receptor plane passing through Q, (QP) and the direction of the scattered photon, QM;

$$\frac{d\sigma}{d\Omega}(\theta, E)$$

is the probability that the photon will be scattered in direction θ;

P is the orthogonal projection of point Q on the detector plane;

exp−(av+ap) represents total attenuation of the flow of X-rays before and after generation of scatter at Q.

The known characteristics of the object may be:

its general shape;

its chemical constituents distributed in different zones, these zones being defined by homogeneous behaviour vis-à-vis scatter radiation due to the fact that the elements of the zone have neighbouring compositions, each zone being defined by its average density value;

the relative lay-outs of the different zones.

The originality of the process of the invention consists of postulating a building method for an approximated model with which it is possible to estimate scatter energy from the observed X-ray.

Under a first embodiment, the process of the invention is such that:

in stage three, the scatter energy map is used as a first estimate of primary energy;

in stage four, for each point on the map of estimated primary energy, along the source-point tracklength a new distribution of density is built proportional to the density values previously allocated in stage two.

The coefficient of proportionality is determined in the following manner:

the decreasing function of primary energy is built in relation to the proportionality coefficient α and to all the characteristics derived from stage two:

$$f(\alpha) = \int_E S(E) \exp\left(-\sum_{|x|}^{n} \alpha d_i \tau_i^{abs}(E) L_i\right) dE$$

| | |
|---|---|
| S(E) | Energy spectrum of the source |
| n | Number of zones through which the source-point tracklength passes |
| α | Coefficient of proportionality |
| di | Density of zone i |
| $\tau_i^{abs}(E)$ | Mass absorption coefficient of zone i at energy E |
| Li | Source-point tracklength under consideration in zone i. | the value α corresponding to the primary energy estimated in stage three is determined.

The new absorption and scatter coefficient values are calculated by multiplying the density with the mass coefficients allocated to each zone in stage two.

In a second embodiment, scatter correction is made for example in the area of mammography. If this area is considered, the process of the invention is therefore such that:

The following equation is used in single energy cases:

$$\text{diff1}(M, E) = \iint_{plane} \Phi(E) \cdot \rho(P) \cdot d(P) e^{-H \cdot \mu abs(P,E)} \cdot \left[ \int_0^H e^{\mu abs(P,E) \cdot z \left(1 - \frac{1}{\cos(\theta)}\right)} \cdot \frac{d\tau^{soft}}{d\Omega}(E, \theta) \cdot \frac{\cos^3(\theta)}{(z+L)^2} \cdot dz \right] \cdot d^2 p + \iint_{plane} \Phi(E) \cdot [1 - \rho(P)] \cdot d(P)$$

$$e^{-H \cdot \mu abs(P,E)} \cdot \left[ \int_0^H e^{\mu abs(P,E) \cdot z \left(1 - \frac{1}{\cos(\theta)}\right)} \cdot \frac{d\tau adip}{d\Omega}(E, \theta) \cdot \frac{\cos^3(\theta)}{(z+L)^2} \cdot dz \right] \cdot d^2 P$$

$\cos(\theta)$ being a funct Dn of z and MP, it will be seen that this scatter can be written as the sum of two non-stationary convolutions:

| | |
|---|---|
| diff 1(M,E) | Number of photons scattered at point M, at energy E |
| $\Phi(E)$ | Number of photons leaving energy source E |
| $\rho(P)$ | Mass of glandular tissue/total mass on the column pressing upon point P |
| d(p) | Density on the column pressing upon column $d(P) = \rho(P) \times$ glandular tissue density $+ (1 - \rho(P)) \times$ fat density in $e^{-H \cdot \mu abs(P,E)}$ |
| $\mu$abs (P,E) | Absorption coefficient at point P, at energy E $= d(P) [\rho(P) \times \tau^{abs}$ (glandular tissue, E) $+ (1 - \rho(P)) \times \tau^{abs}$ (fat, E)] with $\tau^{abs}$ being the mass absorption coefficients |
| H | Height of breast compression |
| z | Position on the column |
| $\theta$ | $\rightarrow \rightarrow$ Angle between (u(Q) and QM Differential mass macroscopic effective section of glandular tissue scatter |
| L | Breast-detector distance |
| P | Point of plane which generates scatter | all "adip" values concern fat and all "mou" values concern glandular tissue.

The object is modelled in cylinder form whose base is its projection over the detector and whose axis is the direction of radiation, made up of small cylindrical columns whose base is formed by the detector pixels and whose axis is the direction of radiation.

the mass absorption, coherent and incoherent scatter coefficients are determined, defined for each energy.

The coherent and incoherent scatter coefficients corrected for shape factor are used for primary components, the coefficients for each column being obtained by the linear combination of these primary components to their respective proportion.

The quantitative map is built in the following manner:
an energy map is built by calibration of the acquisition system;
the proportion of total scatter is evaluated according to object type;
the proportion of scatter of order 1 is evaluated for this type of object;
from this is deducted the proportion of scatter of higher order; this built difference is removed from the energy map, this new map is called primary energy+scatter of order 1;
initialization of primary energy is defined as the map of primary energy+scatter of order 1, from which is removed a difference representing the proportion of scatter of order 1 obtained;
a map of the mass proportions is built, using this primary energy map;
scatter energy is calculated by calculations of functions and convolution on the basis of this map of proportions;
a new map of primary energy is obtained, by subtracting this map of scatter energy from the map of primary energy+scatter of order 1;
return to stage six above; after several iterative calculations, it is converged towards the primary energy map and, on the basis of this map, an image of the object is built, for example an image having glandular tissue thickness.

The invention may be used in several areas of application, for example for non-destructive inspection and in medical radiography in particular:

in the area of weld inspection of nuclear fuel rods: in this case the object is monomaterial, when scatter energy can be determined quite simply on the basis of primary transmission energy (convolution of a primary transmission functional).

in the area of mammography: as indicated above, the breast is made up two materials, fat and tissue, which have similar response to scatter; therefore scatter may be expressed as a function of a transform of the primary transmission map.

in the area of chest radiology: the variety of tissues present in the chest (soft tissue, bone, lungs) requires the support of an anatomic model.

SHORT DESCRIPTION OF THE DRAWINGS

DETAILED DESCRIPTION OF EMBODIMENTS

Figure 1:
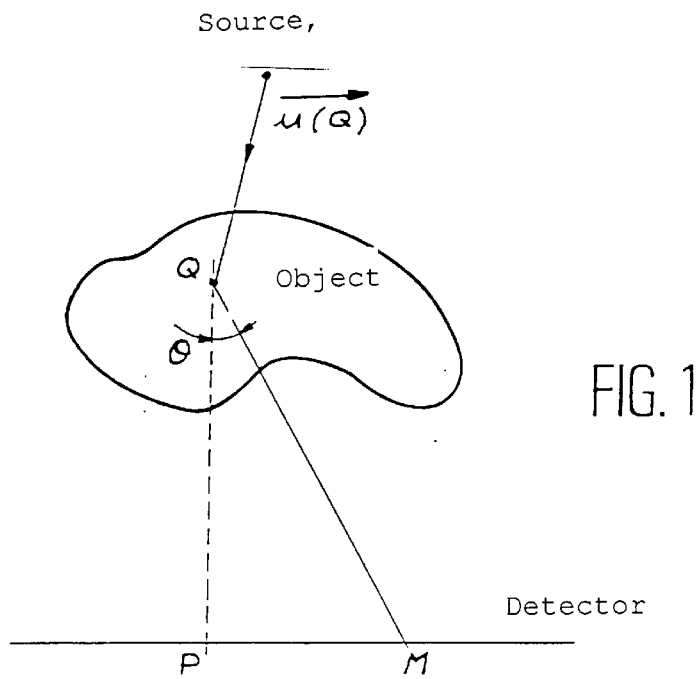
FIG. 1 illustrates an object with no collimator.

The invention concerns a process for improving X-ray resolution (map of observed transmission energy) on the basis of prior knowledge of an object to be examined such as:

its general shape;
its chemical constituents distributed in different zones, these zones being defined by homogeneous response to scatter, due to the fact that the elements of the area have neighbouring compositions, each zone being defined by an average density value;

the relative lay-outs of the different zones.

The process of the invention is a process for correcting scatter energy in digital X-ray images obtained on a detector by means of a source emitting a spectrum of ionizing energies passing through an object. This process comprises the following stages:

1) using an X-ray and a three-dimensional model of the object, a model of the object is generated adapted to its geometry;
2) the energy spectrum of the source is made discrete and to each zone, using the tables established by the above-mentioned physicians, is allocated an average density value, and for each of the energies of the discrete spectrum three mass coefficients are allocated, for absorption, coherent and incoherent scattering, and by multiplying the density with the mass coefficients, the absorption, coherent scatter and incoherent scatter coefficients are determined for each zone and each energy;
3) primary flow energy is mapped;
4) along the source-point tracklength of the primary energy map, a new average density value is determined for each zone and for each source-point tracklength of the detector;
5) for each energy the mass coefficient is multiplied by the density for each source-point tracklength of the detector and for each zone, and a coherent scatter coefficient, an incoherent scatter coefficient and an absorption coefficient are obtained per energy, per tracklength and per zone;
6) the map of scatter energy is determined using the equation giving scatter radiation at a point M given below;
7) the map of primary energy is determined (improved resolution X-ray) by subtracting the map of scatter energy from the map of observed transmission energy and an image of the object is obtained.

Advantageously after stage 7), it is possible to return to stage 3); the transmission energy calculated at stage 7) then becoming the primary energy estimated at stage 3), in such manner as to make successive iterations to improve the final result.

This process requires a compromise between the number of iterations (the higher the number of iterations, the longer the time needed to obtain the image) and the quality of image required.

The invention therefore relates to a process for correcting the first Compton and Rayleigh scattering in digital X-ray images and uses a physical model of X-ray generation.

The direct use of this physical model generally proves impossible as it requires a three-dimensional description of the object which is inaccessible from a single X-ray. The originality of the invention consists of postulating a building method for an approximated model which can be used to estimated scatter on the basis of the observed X-ray.

The process of the invention which can be used to determine and remove scatter energy, comprises three main stages:

equation;
approximation;
determination and subtraction of scatter energy.

Figure 4:
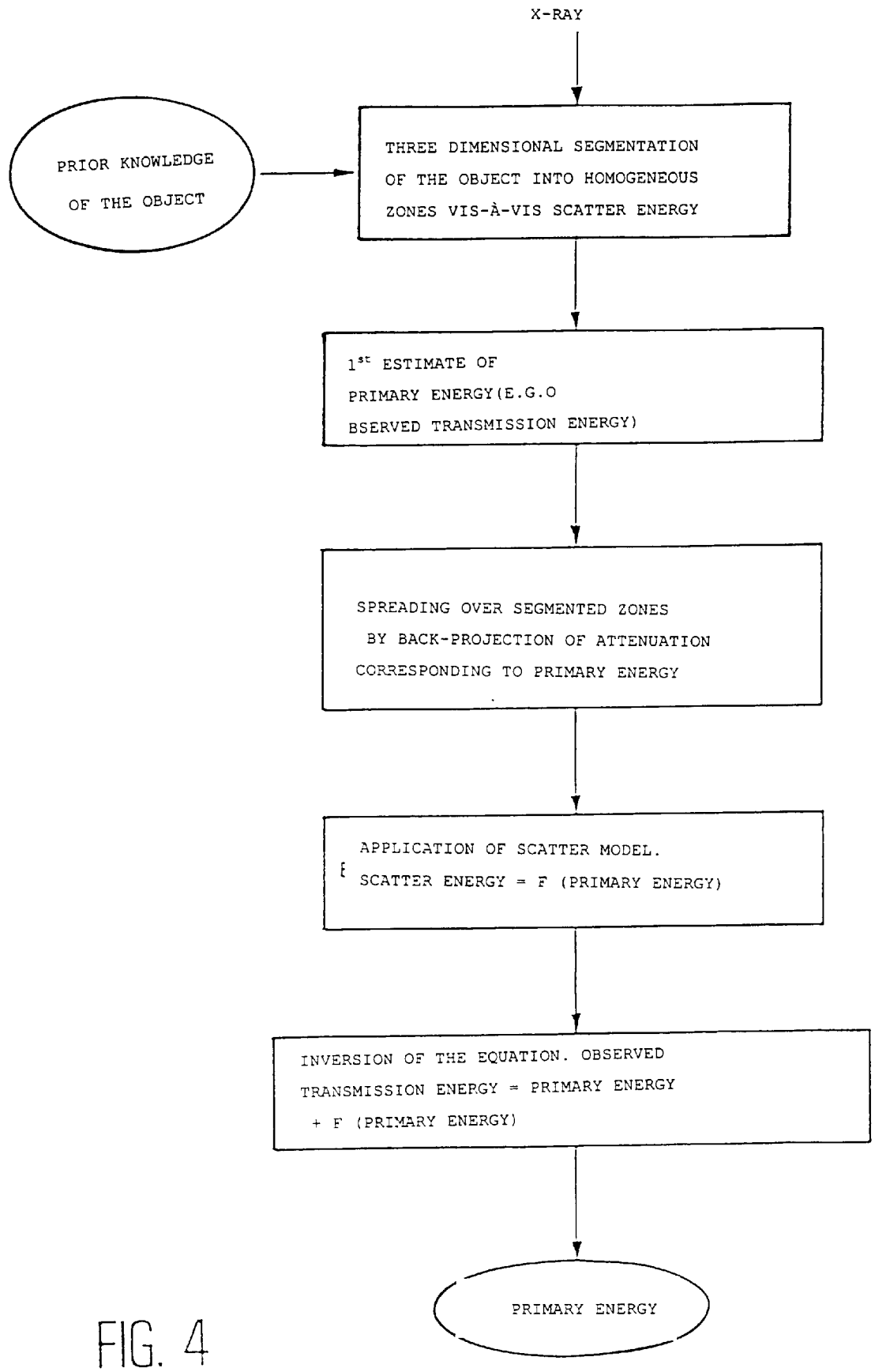
FIG. 4 is an organization chart showing the process of the invention.

Equation of the processes of scatter energy generation is made on the basis of the physical laws which govern the phenomenon. It leads to triple integration whose calculation requires a three-dimensional structural description of the object. Since only one X-ray is available as a general rule this three-dimensional structure is inaccessible. The invention therefore proposes a spreading technique building process, which uses prior knowledge of the observed object and the primary energy map, to make an approximation of the three-dimensional characteristics of the object required to calculate scattering. This process is illustrated in FIG. 4.

On the basis of this approximation an iterative diagram can identify scatter and subtract the latter from the observed X-ray.

Equation

There are two main causes contributing towards scatter energy whose importance is related to the energy spectrum of the source used to carry out the X-ray: Rayeigh scattering and Compton scattering. The equation of the first Rayleigh and Compton scatterings is made using physical laws which govern the phenomenon of scattering.

The main law is given by the formulae of Klein and Nishina and Thompson. They express the probability of generating a scattered photon in a given direction. This probability is multiplied by a coefficient, specific to each material, giving the probability of generating scatter at a site, and by a term expressing the attenuation of X photons in the object. All these laws are precisely described and the attenuation coefficients of the different materials are listed in an article by Hubell et al in 1975 referenced [7] at the end of this disclosure.

With this set of laws it is possible to calculate the scatter generated at each of the elementary points of the object and at each energy.

Figure 2:
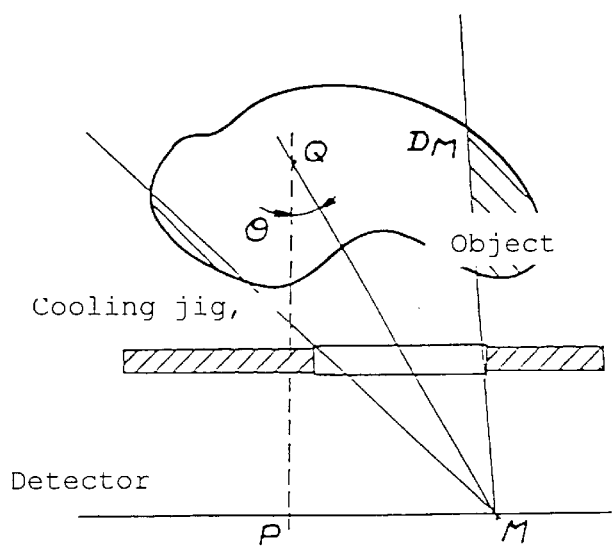
FIG. 2 illustrates a collimated object.
Figure 3:
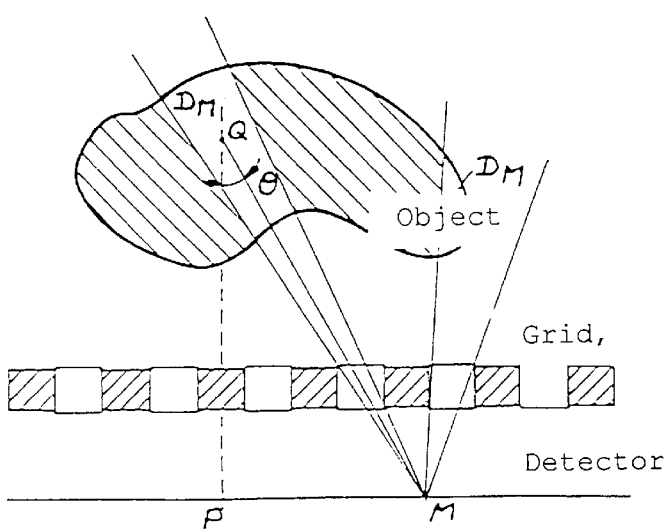
FIG. 3 illustrates an object collimated with a scale.

Triple integration on an area, corresponding to all the points in the object as seen from a detector site (area defined by the collimators placed between the object and the screen, see FIGS. 1, 2 and 3), allows total scatter intensity to be obtained for a given energy.

Scatter at a point M of the detector at an energy E is therefore expressed as:

$$\int\int_{Q \in D_M}\int \mu d(Q, E) \frac{d\sigma}{d\Omega}(\overrightarrow{u(Q)QM}, E) \frac{\cos^3(\theta)}{(QP)^2} \exp(-(av + ap)) dQ \quad (4)$$

where:

$D_M$ is the part of the object seen from point M. For example, if no cooling jig is placed between the object and screen, $D_M$ then represents all the object (FIG. 1). Otherwise $D_M$ represents the intersection between the cone of tip M pressing on the edges of the cooling jig and the object (FIGS. 2 and 3).

$\mu d(Q,E)$ is the probability of generating a scattered photon at point Q. Depending on the case, $\mu d(Q,E)$ represents the probability of generating either Rayleigh scattering or Compton scattering.

$\overrightarrow{u(Q)QM}, E$ is the angle between scatter (direction QM) and incidental direction u(Q) of the X rays arriving at Q.

θ is the angle between the orthogonal to the receptor plane passing through Q, (QP), and the direction of the scattered photon, QM.

$$\frac{d\sigma}{d\Omega}(\theta, E)$$

is the probability that the photon will be scattered in direction θ.

P is the orthogonal projection of point Q on the detector plane.

exp−(av+ap) represents the total attenuation of the flow of X-rays before and after generation of scattering at Q at energy E.

Use of Approximations
Approximation of the Three-dimensional Structure

The main obstacle to the use of the above-determined equation is lack of knowledge of the object's three-dimensional structure. Only the image of observed transmission energy is available, which solely provides information on a three-dimensional projection of the structure. In order to produce an estimate of scatter energy an approximation is made consisting of delocalizing the three-dimensional structures by a spreading operation in the directions of the rays leaving the source, controlled by a simplified three-dimensional model of the object.

The model is based on the knowledge of a three-dimensional model of the segmentation of the object observed in virtually homogeneous zones in respect scattered photon generation.

Object Segmentation

In mammography, for example, it can be considered that fat and tissues have similar response to scatter. The three-dimensional segmentation model therefore corresponds to a single block whose height is determined by the distance between the compression plates and whose side edges are identified on the projection. In chest imaging on the other hand, three types of material need to be taken into consideration for scatter direction: soft tissues (heart, muscle, . . . ), bone, lungs.

The three-dimensional segmentation of the observed object, for the generation and attenuation of scatter, is made beforehand. It is based on a model of the observed "part" (industrial or anatomic) that is adjusted using the X-ray.

Three-dimensional Model for the Generation of Scatter

Each zone of material of the object is allocated the average absorption value given by the tables. The map of scatter energy is used as a first estimate of primary energy. Then, for each point of the estimated primary energy map, a new distribution of density is built along the source-point tracklength, that is proportional to the density values previously allocated. The new absorption and scatter coefficient values are calculated by multiplying the density by the mass coefficients allocated to each zone.

Knowledge of the types of materials making up each segmentation zone and of the associated mass absorption value, $\mu/p$, are used to deduct a density for each zone along the length of the ray and therefore to accede to $\mu_{scatter}$ at each point.

Therefore, from a three-dimensional segmentation of the "part" into zones that have "homogenous" response to scatter, and from the primary energy map, a three-dimensional model of the maps of absorption and scatter generation coefficients can be built for each energy.

Using a scatter simulation programme for objects of simple shape made up of a few materials, it was possible to measure the induced error with this type of approximation. In mammography, for example, it remains below 10%.

Simplified Equation of Scatter

With these approximations it is possible to express the energy of the first scatterings, exclusively using the image of primary energy, the characteristic parameters of the acquisition device, and a simplified three-dimensional segmentation of the object.

A formula of following type is obtained: $\Phi_{scatter}$=F ($\Phi_{primary}$, 3D model)

F Tabling

F is a function which cannot be expressed analytically: it is calculated by a three-dimensional integration of a function of the absorption and scatter generation coefficients previously determined from the map of primary energy and the simplified three-dimensional segmentation.

On the other hand, for some configurations, such as mammography or single material objects, this function may be expressed as a non-stationary convolution of values calculated using the primary flow map. To optimize processing, prior tabling is carried out once and for all for a given system of acquisition. F (($\Phi_{primary}$, 3D model) is tabled.

Determination and Subtraction of Scatter

The solving of the equation:

$$\Phi_{observed} = \Phi_{primary} + F(\Phi_{primary}, \text{3D model}) \qquad (5)$$

determines primary transmission.

This equation may be solved by a fixed point method initiated either by the map of observed transmission or an initial scatter map determined by convolution or deconvolution.

First Embodiment

In a first embodiment, the process of the invention is such that:

at stage three the scatter map is taken as the first estimate of primary energy;

at stage four, for each point on the map of estimated primary energy, along the source-point tracklength a new distribution of density is built that is proportional to the density values previously allocated in stage two.

The coefficient of proportionality is determined in the following manner:

the decreasing function of primary energy is built in relation to the coefficient of proportionality α and to all the characteristics derived from stage two:

$$f(\alpha) = \int_E S(E) \exp\left(-\sum_{|x|}^n \alpha d_i \tau_i^{abs}(E) L_i\right) dE$$

| | |
|---|---|
| S(E) | Energy spectrum of the source |
| n | Number of zones through which the source-point tracklength passes |
| α | Coefficient of proportionality |
| di | Density of zone i |
| $\tau_i^{abs}(E)$ | Mass absorption coefficient of zone i at energy E |
| Li | Source-point tracklength under consideration in zone i. | the value α corresponding to the primary energy estimated at stage three is determined.

The new absorption and scatter coefficient values are calculated by multiplying the density by the mass coefficients allocated to each zone in stage two.

Second Embodiment

In a second embodiment, scatter correction is carried out, for example in the area of mammography. If this area is considered, the process of the invention is therefore such that:

The prior knowledge used for the construction of the first three-dimensional model is:

breast compression thickness;

main breast constituents: fat/glandular tissue, these two constituents being intermingled.

A simplification of formula (4) is obtained giving scatter at a point M of the detector in monochromatic conditions for mammography.

For the object model and simplification of the formula, a parallel radiation hypothesis is added which is justified in mammography by the source-object distance in the region of 60 cm.

Figure 5:
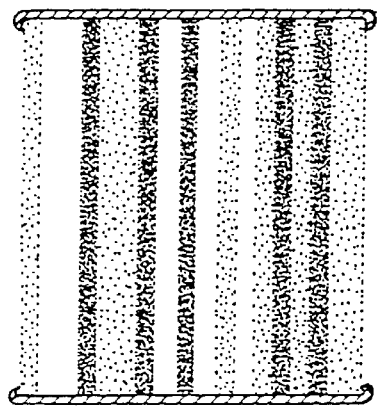
FIG. 5 shows a three-dimensional model of the breast.

The breast is modelled in cylinder form as illustrated in FIG. 5 whose base is its projection on the detector and whose axis is the direction of radiation, made up of small cylindrical columns whose base is formed by the detector pixels, whose axis is the direction of radiation and whose height is breast compression height.

To calculate scatter, the breast is assumed to be made up exclusively of two materials: glandular tissue and fat.

Each column is assumed to be homogeneous in fat over glandular tissue proportion.

Since variations in proportions operate slowly in the breast, the hypothesis is added that photon X after scatter maintains the same absorption coefficient as that in the column before scatter.

On account of the low radiation energy in mammography, the energy of the photon after scatter is assumed to be equal to that before scatter.

Under all these hypotheses, the formula giving scatter at a point M of the detector is written in the form of convolution of a function of primary transmission:

$$\iint\limits_{detector} \hat{F}(\text{proportion, attenuation, scatter})$$

$$(P) \cdot \hat{K}(\text{average breast attenuation, } H)(PM)dS$$

This expression is a convolution expression of which K represents the kernel.

More precisely, in a single energy case:

$$\text{diff1}(M, E) = \iint\limits_{plane} \Phi(E) \cdot \rho(P) \cdot d(P) e^{-H \cdot \mu abs(P,E)} \cdot \left[ \int_0^H e^{\mu abs(P,E) \cdot z \left(1 - \frac{1}{\cos(\theta)}\right)} \cdot \frac{d\tau^{soft}}{d\Omega} \right.$$

$$\left. (E, \theta) \cdot \frac{\cos^3(\theta)}{(z+L)^2} \cdot dz \right] \cdot d^2 p + \iint\limits_{plane} \Phi(E) \cdot [1 - \rho(P)] \cdot d(P)$$

$$e^{-H \cdot \mu abs(P,E)} \cdot \left[ \int_0^H e^{\mu abs(P,E) \cdot z \left(1 - \frac{1}{\cos(\theta)}\right)} \cdot \frac{d\tau adip}{d\Omega}(E, \theta) \cdot \frac{\cos^3(\theta)}{(z+L)^2} \cdot dz \right] \cdot$$

$$d^2 P$$

cos (θ) being a function of z and MP, it can be seen that this scatter can be written as the sum of two non-stationary convolutions:

| | |
|---|---|
| diff 1(M,E) | Number of photons scattered at point M, at energy E |
| φ(E) | Number of photons leaving energy source E |
| ρ(P) | Mass of glandular tissue/total mass on the column pressing upon point P |
| d(p) | Density on the column pressing upon column d(P) = ρ(P) × glandular tissue density + (1 − ρ(P)) × fat density in $e^{-H \mu abs(P,E)}$ |
| μabs(P,E) | Absorption coefficient at point P, at energy E |
| $\frac{d\tau_{soft}}{d\Omega}(E, \theta)$ | = d(P) [ρ(P) × $\tau^{abs}$ (glandular tissue, E) + (1 − ρ(P)) × $\tau^{abs}$ (fat, E)] with $\tau^{abs}$ being the mass absorption coefficients |
| H | Height of breast compression |
| z | Position on the column |
| θ | Angle between $\vec{u}(Q)$ and $\vec{QM}$ Differential mass macroscopic effective section of glandular tissue scatter |
| L | Breast-detector distance |
| P | Point of plane which generates scatter |

The mass absorption and scatter coefficients are defined per energy.

Figure 6:
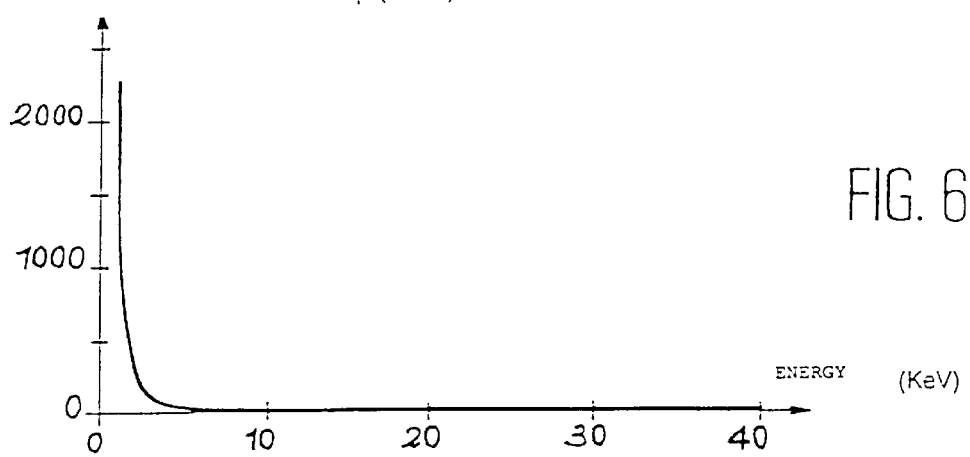
FIG. 6 shows an absorption coefficient curve $\mu$ for fat in relation to energy.
Figure 7:
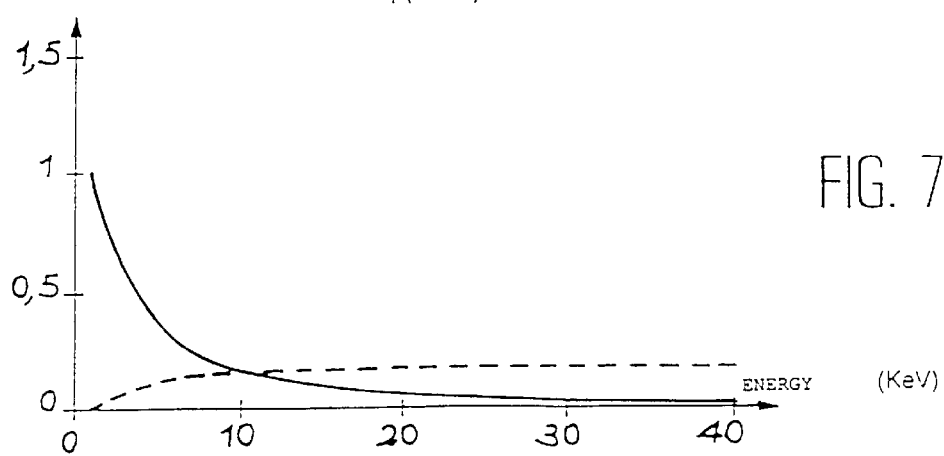
FIG. 7 shows a curve of the coherent and incoherent scatter coefficient for fat in relation to energy.

The different mass absorption and scatter coefficients depend upon energy as illustrated in FIGS. 6 and 7: in FIG. 6 the tissue is fat tissue and the absorption coefficient μ is the photoelectric coefficient; in FIG. 7 the tissue is also fat and the coefficient μ is either a coherent coefficient (continuous line carve) or an incoherent coefficient (dotted line).

Figure 8:
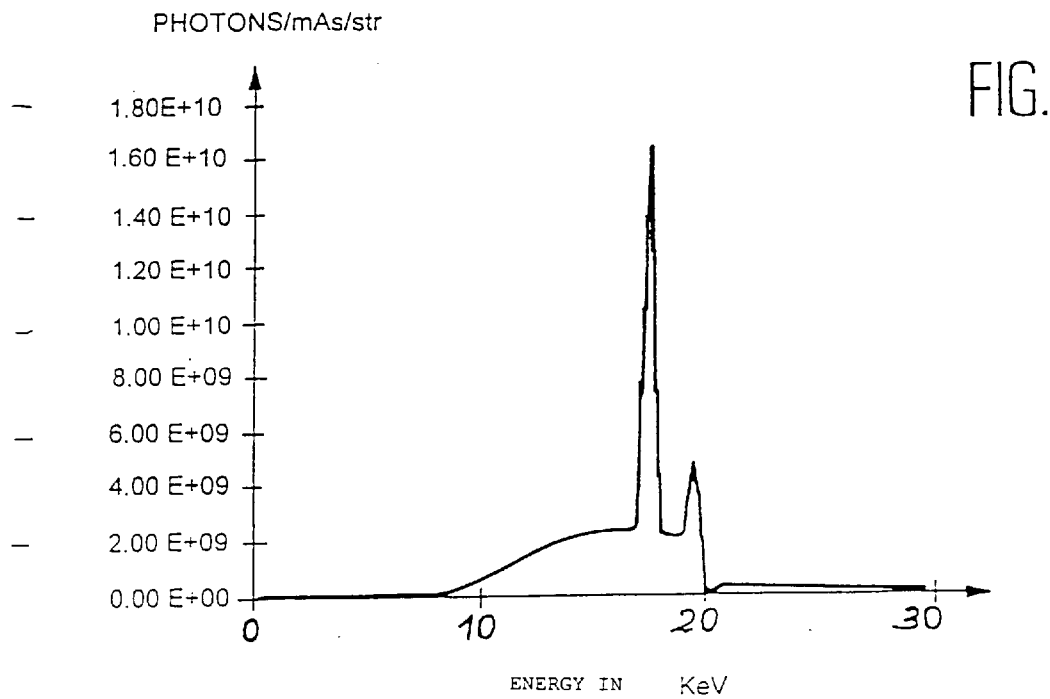
FIG. 8 shows a generator spectrum in mammography.

FIG. 8 shows the spectrum of a generator for mammography.

The formula is then written:

$$\iint\limits_{detector} \hat{F}(\text{proportion, attenuation, scatter})$$

$$(P) \cdot \hat{K}(\text{average breast attenuation, } H)(PM)dS$$

or:

$$\hat{F}(\text{average breast attenuation 1, } H)(H) = \quad (8)$$

$$\int_E S(E) Fe(\text{proportion, attenuation }(E), \text{scatter})(E)\Big|(P) dE$$

-continued $$\hat{K}(\text{average breast attenuation}, H)(PM) = \quad (9)$$
$$\int_E S'(E)K(\text{average breast attenuation }(E), H)(PM)dE$$

in which S(E) is the source spectrum and S'(E) the spectrum after the radiation passes through a breast of average composition (50% fat and glandular tissue) and whose height is the compression height.

Figure 9:
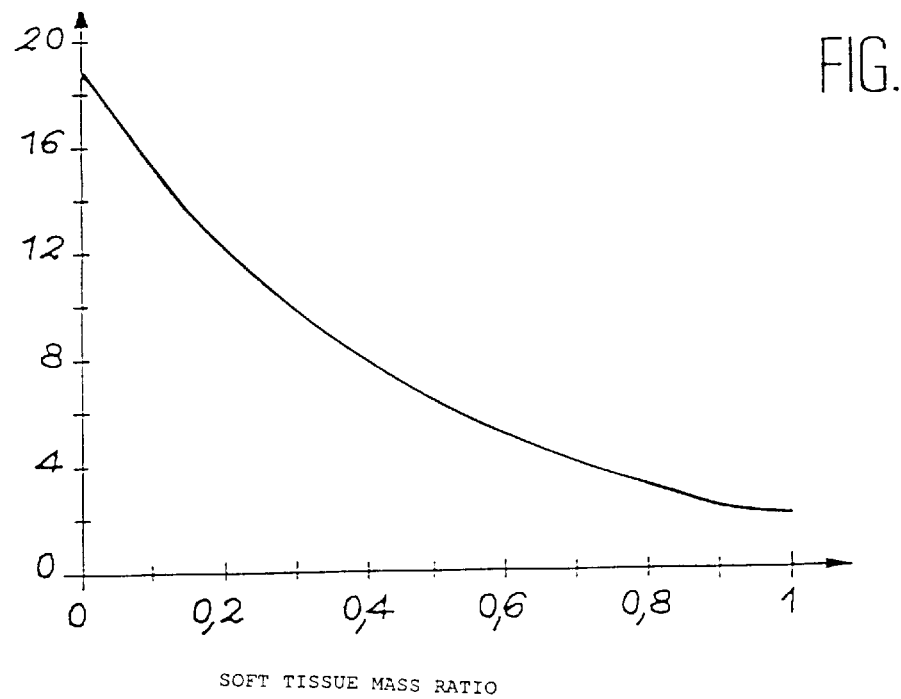
FIG. 9 illustrates a curve of primary energy in relation to the composition of a column.

For a given compression height, for a given source spectrum, a curve is built connecting the primary energy to the proportion of glandular tissue mass in relation to total mass:

the source spectrum being known, it is possible, for a given breast composition of glandular tissue and fat proportion and for a given compression height, to calculate the radiation energy after passing through such composition. By making this calculation for the different compositions, a curve is traced giving, at a given breast height, the primary energy in relation to breast composition, such as illustrated in FIG. 9.

In the algorithm, this curve is used, on the basis of the primary energies found at one stage, to redefine a new composition in the breast in order to carry out a further calculation of scatter.

The coherent and incoherent scatter coefficients, adjusted for shape factor, are used for the primary components: fat and glandular tissue. The coefficients for each column are obtained by linear combination of these two components in their respective proportion.

The coherent and incoherent scatter coefficients depend upon the structure of the atoms making up the molecule, the preceding formula (4) is then modified by replacing:

$$\mu d(Q, E) \frac{d\sigma}{d\Omega} [\overrightarrow{(u(Q)}, \overrightarrow{\hat{QM}}, E)]$$

(scatter distribution in one direction is broken down into a proportion of scatter at the site depending upon site composition through distribution over the angles that is composition-independent) by:

$$\frac{d\mu_{\text{diff}}}{d\Omega} \left[ Q, E, \overrightarrow{(u(Q)}, \overrightarrow{\hat{QM}} \right]$$

(angle distribution at a site is now dependent upon site composition).

As in the first formulation, formula (4) can be generalized in the same manner to a multi-energy context.

Scatter radiation is expressed in an order 0 as convolution of a function of the map of the mass proportions of glandular tissue in relation to total mass by a stationary kernel. In an order 1, this kernel may be specified by adding a corrective term taking into consideration spatial variations of proportion: this corrective term is expressed as a second convolution of a function of the map of the proportion of glandular tissue mass in relation to total mass by a stationary kernel:

In equation (6) the term K appears (average breast attenuation, H) (PM), this term results from an approximation of the more general term K (breast attenuation (P), H) (PM). This approximation is called approximation to the order 0. If a limited development is made of this function using the "breast attenuation" variable for the "average breast attenuation" value, increasingly refined approximations of scatter can be obtained. The models obtained in this way are called model of order 1, . . . .

Improvement in model representativeness requires additional convolutions.

In a mammography, are superimposed primary energy, first scatter energy and scatter energies of higher order (having undergone more than one Compton scattering). The preceding correction model models and allows the first scatters to be corrected. In order to implement the method on an actual mammogram, the energy of higher order scattering must be determined. Owing to the low radiation energy used in mammography, scatter energy of an order of 2 or higher is assumed to be constant at all detector sites. This constant value is called "offset".

To identify this offset, use is made of the tabled values of the proportion of energy scatter in relation to total energy for different breast types, and compiling (obtained by a simulation programme) of the proportion of scatter energy of order 1 in relation to primary energy for different breast types. By combination, for a given mammogram, scatter energy of an order of 2 or more can be found. This constant, called offset is removed from the observed energy.

The quantitative map is then built in the following manner:

an energy map is built by calibration of the acquisition system;

the proportion of total scatter is evaluated for the breast type;

the proportion of scatter of order one is evaluated for this breast type;

the proportion of scatter of higher order is deduced therefrom; the offset thus built is removed from the energy map, this new map is called primary energy+scatter of order 1 map;

initialisation of primary energy is defined as the map of primary energy+scatter of order 1;

a map of glandular tissue mass proportions in relation to total mass is built using this primary energy map;

through calculation of functions and convolutions, scatter energy is evaluated using this map of proportions;

a new map of primary energy is obtained by subtracting this map of scatter energy from the map of primary energy+scatter of order 1;

return to stage six above.

With a few iterations, convergence is made towards the map of primary energy. Using this map an image of glandular tissue thickness is constructed.

REFERENCES

[1] "Scatter-Glare Correction using a Convolution Algorithm With Variable Weighting" by Shaikh Naimuddin, Bruce Hasegawa and Charles A. Mistretta (Medical Physics, vol. 14, n°3, May/June 1987, pages 330 to 334).

[2] "A Regional Convolution Kernel Algorithm for Scatter Correction in Dual-Energy Images: Comparison To Single-Kernel Algorithms" by David G. Kruger, Frank Zink, Walter W. Peppler, David L. Ergun and Charles A. Mistretta (Medical physics, vol. 21, n°2, February 1994, pages 175 to 184).

[3] "Computing The Scatter Component of Mammographic Images" by R. P. Highnam, J. M. Bready and B. J. Shepstone (IEEE Transactions on Medical Imaging, vol.13, N°2, June 1994, pages 301 to 313).

[4] "Scatter Compensation In Digital Chest Radiography Using Fourier Deconvolution" by Carey E. Floyd, Peter T. Beatty and Carl E. Ravin (Investiture Radiology, vol. 24, n°1, 1989, pages 30 to 33).

[5] "X-Ray Scatter Removal by Deconvolution" by J. A. Seibert, J. M. Boone (Medical Physics, vol. 15, n°4, July/August 1988, pages 567 to 575).

[6] "Modéles de dégradations en radiographic et restauration d'images" by Catherine Burq (Thesis, Docteur en Sciences Mathématiques, Université Paris Sud, Centre d'Orsay, defended on Mar. 5, 1992).

[7] "Atomic Form Factors, Incoherent Scattering Functions, and Photon Scattering Cross Sections" by J. H. Hubbell, Vm. J. Veigele, E. A. Briggs, R. T. Brown, D. T. Cromer and R. J. Howerton (J.Phy.Chem. Ref. Data, vol.4, n°3, 1975, pages 471 to 496).

[8] "An Analytical Model of the Scattered radiation distribution in Diagnostic Radiology" by J. M. Boone, J. A. Seibert (Medical Physics, vol. 15, n°5, Sept./Oct. 1988, pages 721 to 725.

What is claimed is:

1. Process for the correction of scatter energy in digital X-ray images obtained on a detector, by means of a source emitting a spectrum of ionizing energies which pass through an object, comprising the following stages:

using an X-ray and a first three-dimensional model of the object, a second model of the object is generated adapted to its geometry;

the energy spectrum of the source is made discrete and to each zone of this object an average density value is allocated and, for each of the energies of the discrete spectrum three mass coefficients of absorption, coherent scatter and incoherent scatter are allocated, and, by multiplying the density with these mass coefficients, the coefficients of absorption, coherent scatter and incoherent scatter are determined for each zone;

primary energy is mapped;

along the source-point tracklength of the map of primary energy, a new average density value is determined for each of these zones and for each source-point tracklength of the detector;

for each energy the mass coefficient is multiplied by the density for each source-point tracklength of the detector and for each zone, and a coherent scatter coefficient and an incoherent scatter coefficient is obtained per energy, per tracklength, and per zone;

scatter energy is mapped;

the map of primary energy is determined by subtracting the map of scatter energy from the map of observed transmission and an image of the object is obtained.

2. Process in accordance with claim 1, in which it is returned to stage three, the primary energy calculated during stage seven becoming the estimated primary transmission of stage three so as to make successive iterations to improve the final result.

3. Process in accordance with claim 1, in which at stage six, the following equation is used which expresses scatter at a point M of the detector for a given energy E:

$$\int\int_{Q\in D_M}\int \mu d(Q,E)\frac{d\sigma}{d\Omega}(\overrightarrow{u(Q)QM},E)\frac{\cos^3(\theta)}{(QP)^2}\exp(-(av+ap))dQ$$

in which:

$D_m$ is the part of the object seen from point M;

$\mu d(Q,E)$ is the probability of generating a scattered photon at point Q;

$\overrightarrow{u(Q)QM}$ is the angle between scatter direction (QM) and incident direction u(Q) of the X rays arriving at Q;

θ is the angle between the orthogonal on the receptor plane passing through Q, (QP) and the direction of the scattered photon, QM;

$$\frac{d\sigma}{d\Omega}(\theta,E)$$

is the probability that the photon will be scattered in direction θ;

P is the orthogonal projection of point Q on the detector plane;

exp−(av+ap) represents total attenuation of the flow of X-rays before and after generation of scatter at Q.

4. Process in accordance with claim 1, in which the known characteristics of this object are:

its general shape;

its chemical constituents distributed over different zones, these zones being defined by their homogeneous response to scatter due to the fact that the compositions of the elements of the zone are similar, each zone being defined by an average density value;

the relative lay-outs of the different zones.

5. Process in accordance with claim 1, in which in stage three the map of scatter energy is used as the first estimate of primary energy;

in stage four, for each point on the map of the estimated primary energy, along the source-point tracklength, a new distribution of density is built that is proportional to the density values previously allocated in stage two;

in which the coefficient of proportionality is determined in the following manner:

the decreasing function of primary energy is built in relation to the coefficient of proportionality a and to all the characteristics derived from stage two:

$$f(a)=\int_E S(E)\exp\left(-\sum_{|x|}^n \alpha d_i \tau_i^{abs}(E)L_i\right)dE$$

$S(E)$: Energy spectrum of the source $n$: Number of zones through which the source-point tracklength passes $\alpha$: Coefficient of proportionality $di$: Density of zone $i$ $\tau i^{abs}(E)$: Mass absorption coefficient of zone $i$ at energy $E$ $Li$: Source-point tracklength under consideration in zone $i$.

· – Value a is determined corresponding to the primary energy estimated at stage three;

in which the new coefficient values of absorption and scatter are, calculated by multiplying the density by the mass coefficients allocated to each zone in state two.

6. Process in accordance with claim 5, in which, in stage three, the map of observed flow is used as first estimate of the map of primary transmission.

7. Process in accordance with claim 1, in which the following equation is used:

$$diff\ 1(M, E) = \int_{plan} \int \Phi(E) \cdot \rho(P) \cdot d(P) e^{-H \cdot \mu abs(P,E)} \cdot \left[ \int_0^H e^{\mu abs(P,E) \cdot z \cdot \left(1 - \frac{1}{\cos(\theta)}\right)} \cdot \frac{d\,\tau mou}{d\Omega}(E, \theta) \cdot \frac{\cos^3(\theta)}{(z+L)^2} \cdot dz \right] \cdot d^2P +$$

$$\int_{plan} \int \Phi(E) \cdot [1 - \rho(P)] \cdot d(P) e^{\mu abs(P,E)} \cdot \left[ \int_0^H e^{\mu abs(P,E) \cdot z \cdot \left(1 - \frac{1}{\cos(\theta)}\right)} \cdot \frac{d\,\tau adip}{d\Omega}(E, \theta) \cdot \frac{\cos^3(\theta)}{(z+L)^2} \cdot dz \right] \cdot d^2P$$

$\cos(\theta)$, being a function of $z$ and $MP$, it is seen that this scatter can be written as the sum of two non-stationary convolutions:

| | |
|---|---|
| diff 1(M,E) | Number of photons scattered at point M, at energy E |
| $\phi(E)$ | Number of photons leaving energy source E |
| $\rho(P)$ | Mass of glandular tissue/total mass on the column pressing upon point P |
| d(p) | Density on the column pressing upon column (P) = p(P) × glandular tissue density + (1 − p(2)) × fat density in $e^{-H \cdot \mu abs(P,E)}$ |
| $\mu abs(P,E)$ | Absorption coefficient at point P, at energy E<br>= d(P) [ρ(P) × $\tau^{abs}$ (glandular tissue, E) + (1 − ρ(P)) × $\tau^{abs}$ (fat, E)]<br>with $\tau^{abs}$ being the mass absorption coefficients |
| H | Height of breast compression |
| z | Position on the column |
| θ | Angle between $\vec{u}(Q)$ and $\vec{QM}$ |
| $\frac{d\tau_{mou}}{d\Omega}(E, \theta)$ | Differential mass macroscopic effective section of glandular tissue scatter |

-continued

| | |
|---|---|
| L | Breast-detector distance |
| P | Point of plane which generates scatter. |

8. Process in accordance with claim 7, in which the object is modeled in cylinder form whose base is its projection on the detector and whose axis is the direction of radiation, made up of small cylindrical columns whose base is the detector pixels and whose axis is the direction of radiation.

9. Process in accordance with claim 7, in which the mass absorption and scatter coefficients are determined energy by energy.

10. Process in accordance with claim 7, in which the coherent and incoherent scatter coefficients, corrected for shape factor, are used for primary components, the coefficients for each column being obtained by linear combination of these primary components in their respective proportion.

11. Process in accordance with claim 7, in which the quantitative map is built in the following manner:

an energy model is built by calibration of the acquisition system;

the proportion of total scatter is evaluated according to object type;

the proportion of scatter of order I is evaluated for this object type;

the proportion of higher order scatter is deduced therefrom; the difference thus built is removed from the energy map, this new map being called the map of primary energy+scatter of order 1;

the primary energy+scatter of order I map is defined as initialization of primary energy;

a map of mass proportions is built, using this map of primary energy;

by calculating functions and using convolutions, scatter energy is evaluated using this proportion map;

a new map of primary energy is obtained by subtracting this map of scatter energy from the map of primary energy+scatter of order 1;

return to stage six above;

and in which, after a few iterations, convergence is made towards the map of primary energy, and in which on the basis of this map an image of the object is built.

* * * * *